Nov. 24, 1959     K. A. HARPER     2,914,458
METAL CONTAMINANT REMOVAL FROM CATALYTIC CRACKING FEEDSTOCK
Filed May 21, 1956
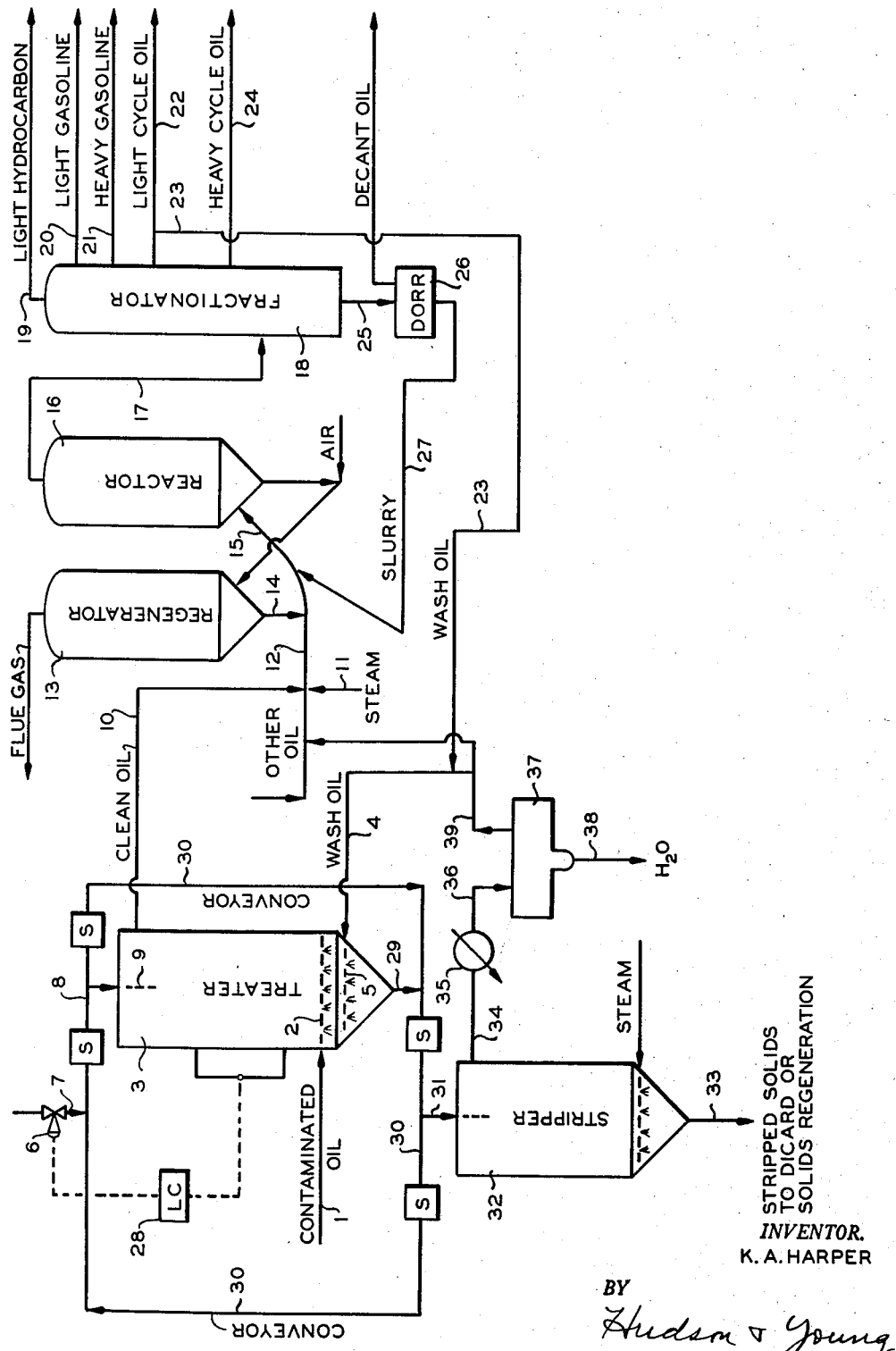
INVENTOR.
K. A. HARPER
BY
Hudson & Young
ATTORNEYS

United States Patent Office

2,914,458
Patented Nov. 24, 1959

2,914,458

METAL CONTAMINANT REMOVAL FROM CATALYTIC CRACKING FEEDSTOCK

Kenneth A. Harper, Bartlesville, Okla., assignor to Phillips Petroleum Company, a corporation of Delaware Application May 21, 1956, Serial No. 586,281

6 Claims. (Cl. 208—88)

This invention relates to removal of metal contaminants from hydrocarbon oils which are to be converted, for example, by cracking in the presence of a catalyst. In one of its aspects the invention relates to an operation in which a metal contaminated oil is contacted with a downwardly moving bed of contact material such as clay, the oil passing upwardly, in liquid phase, through the clay at a predetermined temperature, the upward flow of oil being aided by use of a clean wash oil, in one embodiment, derived from the process, the said wash oil and clean oil then being admixed with a catalyst and converted in the presence of said catalyst at an elevated conversion temperature to obtain useful products. In another aspect of the invention it relates to the removal of metal contaminants from a crude oil employing an operation substantially as just described and as more fully described below.

It has been known for some time that certain oils contain objectionable metal contaminants which, when deposited upon catalyst employed in the conversion of said oil, act adversely upon the catalyst. Thus, the presence of metallic contaminants, such as nickel, vanadium, iron and copper, which deposit upon and deactivate cracking catalysts, is particularly undesirable in charge stocks which are to be treated and this is especially so in a fluid catalytic cracking operation. In such an operation the addition of large amounts of make-up catalysts over and above the amounts of catalysts necessary to replace lost fines may be necessary in order to maintain equilibrium activity. Thus, of course, increases the cost of the refining treatment. Also, the presence of the metals upon the catalysts increases the coke lay-down on the catalyst and this in turn increases the regeneration cost. Several processes have been suggested for the conversion of oils which, as obtained, contain metallic contaminants. Thus, in one operation which has been described in the art, a hydrocarbon oil which contains an inorganic contaminant is pretreated by contact with catalyst fines at an elevated temperature and adsorbing the said contaminant onto the fines before the charge is further contacted with active catalyst. In this process the oil, fines, and therefore contaminants are then contacted with a main body of fluidized cracking catalyst. In another operation the feed stock is contacted with a small quantity of contact clay such as that used in lube oil contacting operations but having a substantially smaller particle size, following which the oil-clay mixture is contacted with a catalyst. Thus, the clay, contaminants, and oil are contacted with the catayst.

It is an object of this invention to provide a process for the conversion of oils containing contaminants, especially metallic contaminants such as described herein. Another object of the invention is to provide a modus operandi novel for the removal of metallic contaminants from hydrocarbon oils before these oils are contacted with hydrocarbon conversion catalysts, especially a fluid catalyst. Other aspects, objects and the advantages of the invention are apparent from a study of this disclosure, the drawing and the appended claims.

According to this invention there is provided a combination of steps for the conversion into useful products of a metals-contaminated oil stock, which comprise contacting said oil, in liquid phase, with a metals-contaminant adsorbent material such as clay in countercurrent manner, the clay moving downwardly in a treating zone while the oil percolates or otherwise moves upwardly therethrough, the oil being heated to a temperature of at least about 500° F. but not above a temperature at which under all of the conditions of treatment substantial decomposition or conversion thereof will occur, and then feeding purified oil removed from a top portion of said treating zone to a hydrocarbon conversion zone and therein converting the said oil in the presence of a catalyst at a conversion temperature.

As a feature of the present invention, there is employed a wash oil which is introduced into contact with the adsorbent at a point below the point of introduction of the contaminated oil, the said wash oil aiding the flow of the contaminated oil through the adsorbent. Preferably, the wash oil will consist of an intermediate or cycle stream obtained in a hydrocarbon conversion process. Advantageously, said wash oil will be a stream of light cycle oil or gas oil.

Further, as a feature of the invention, the clay or other adsorbent is removed from the treating zone at a bottom portion thereof. The clay can be washed at this point. However, if a wash oil has been employed and it has been injected below the point of injection of the contaminated oil, then the wash oil can be employed in a quantity and be of a character such that clay is already washed as removed from the treating zone. The clay is then fed to a stripper wherein residual quantities of oil and/or wash oil are stripped from the adsorbent. The adsorbent can be returned for reuse. Overhead from the stripper is cooled, condensed and passed to a phase separator from which water is removed as a bottom layer and wash oil, which may contain some of the treated or feed oil, is removed as an upper layer and returned, preferably with the main portion of wash oil to the treating zone.

Referring to the drawing, contaminated oil is fed by way of pipe 1 and distributor means 2 into the lower portion of a treater vessel 3. Although not absolutely necessary, but now preferred to be employed, is a wash oil which is introduced through pipe 4 and distributor means 5 into the lower portion of treater vessel 3. Although the wash oil can suitably be introduced above distributor means 2, it is preferably introduced below distributor 2 for reasons which are apparent from this disclosure. The contaminated oil rises upwardly aided by the wash oil, through a bed of treating solids such as clay, catalyst pellets, etc., which are known in the art to adsorb or to otherwise sequester metal contaminants from oils. The level of treating solids is shown in the drawing to be maintained by a level controller 28. The details of this controller are not shown for sake of simplicity. They form no part of the present invention. The level controller acts upon valve 6 in pipe 7 to add treating solids by way of pipe 8 and 9 to vessel 3. The boxes marked with a "S" are intended diagrammatically to show seals which are required, as will be apparent to one skilled in the art in possession of this disclosure. Clean oil is removed from the top of vessel 3 by way of pipe 10 admixed with steam introduced by way of pipe 11 and passed by way of pipe 12 into admixture with regenerated catalyst coming from regenerator 13 by way of pipe 14 and then passed by way of riser 15 into reactor 16 for conversion under conditions of hydrocarbon oil conversion, which are well known in the art. Briefly, a silica-alumina type catalyst can be employed. The temperature will be in the range of from about 750° F. to about 1000° F. From reactor 16 cracked products are taken overhead in known manner and passed by way of pipe 17 to fractionator 18. In fractionator 18 the converted hydrocarbons are separated into fractions, lowest boiling material containing olefins being taken overhead by way of pipe 19, a light gasoline taken off as a side stream 20, a heavy gasoline taken off as a sidestream 21, and a light cycle oil taken off as a sidestream 22. Sidestream 22 suitably furnishes, in this embodiment, the wash oil, which is passed by way of pipe 23 into pipe 4 as wash oil for treater vessel 3. A heavy cycle oil is taken off by way of pipe 24. Bottoms from fractionator 18 are passed by way of pipe 25 into a Dorr-type thickener 26 from the bottom of which a slurry containing entrained catalyst and heavy oil is passed by way of pipe 27 into riser 14. From the bottom of treater vessel 3 washed contact material is removed by way of pipe 29 and passed by way of pipe 30 and 31 into stripper 32. In stripper 32 contact material is stripped with steam, spent contact material is removed by way of pipe 33. Overhead constituting wash oil, some charge oil, and water is passed by way of pipe 34, condenser 35, and pipe 36, into phase separator 37. In phase separator 37 water separates and is removed as bottoms by way of pipe 38. Wash oil is taken off by way of pipe 39 and admixed with the wash oil in pipe 4 for return to treater vessel 3. It is not always necessary nor is it now preferred to strip all of the contact material each time it has been used. Thus, the contact material can continue in pipe 30 to pipe 8 and be returned by way of pipe 9 to treater vessel 3. As shown in the drawing, pipe 30 can form a complete circuit around treater vessel 3 for conveying a slipstream of solids from pipe 8 downwardly around treater vessel 3, thus lending flexibility to the operation in which some or all of the solids can be steam stripped or by-passed as desired. Solids removed by way of pipe 33 from the bottom of stripper 32 can be discarded or if desired to be pretreated by steaming, can be returned by means not shown to a solids storage. Furthermore, when stripper 32 is operating only upon a slipstream of used treating solids, the solids removed by way of pipe 33 can be sent to a regeneration zone, also not shown. From the regeneration zone the solids can be stored until desired for use in the process. It will be noted that in the process according to the invention, none of the treating solids passes with the clean oil into the hydrocarbon conversion phase of the operation. Also, it will be noted that great flexibility is inherent in the operation as set forth and described in the embodiment of the drawing. Thus, the rate of flow of treating solids through the treater is not dependent upon the rate of flow of oil to the conversion operation. Furthermore, liquid phase is employed with all of its concomitant advantages of intimate and thorough contact. Pressure upon the treater vessel 3 can be employed sufficient to maintain liquid phase whenever the oil being treated contains vaporous fractions which will tend to vaporize unduly at the temperature of treatment which has been selected.

Oils which can be treated according to the process of the invention are various. Crude oil, residual oil, and intermediate oils can be treated. The process is particularly applicable to the treatment of heavy gas oils which are derived by vacuum distillation of crude oils and which contain large quantities of metal contaminants, as well as treatment of such residual oils containing metal contaminants.

*Specific operation*

In a specific operation of the invention, a residual hydrocarbon oil API 60° F./60° F. of 12 degrees, is introduced at 1 containing 300 parts per million metal contaminants (measured as iron oxide, nickel oxide, and vanadium oxide), and is processed in treater 3 in the presence of a bentonite-type clay, montmorillonite pellets of 3/16 inch size, at a temperature of 700° F., and at a pressure sufficient to maintain the oil in the liquid state. The weight space velocity in treater 3 is ten pounds of oil per hour per pound of solid reagent. The metals content of the treated oil 10 is 60 parts per million. The thusly treated oil is catalytically cracked in the conventional unit 16 to sixty percent conversion. The cracking of the low metal content oil of the invention results in 10 percent less coke and 5 percent more gasoline as compared with a similar cracking of the untreated oil containing 300 parts per million metal contaminants.

Reasonable variation and modification are possible within the scope of the foregoing disclosure, drawing and the appended claims to the invention the essence of which is that a metals contaminated oil to be converted in a hydrocarbon conversion operation in the presence of a catalyst is a priori flowed upwardly, countercurrently to a downwardly moving bed of adsorbent solids such as clay, etc. as described herein, metals-free oil is removed at the top of the bed of treating solids and passed to a conversion operation and therein converted, also as described herein, in one embodiment a wash oil, preferably derived from the hydrocarbon conversion operation, is employed to assist the contaminated oil in its flow through the treater zone in which are moving downwardly the clay or other solids which are employed.

I claim:

1. A method for treating a metals-contaminated oil which is to be cracked at an elevated temperature in the presence of a catalyst which comprises flowing said oil in liquid phase at a temperature of at least about 500° F. and not in excess of a temperature at which substantial decomposition of said oil will occur upwardly through a treating zone countercurrent to a downwardly moving bed of contiguous adsorptive treating solids adapted to remove contaminating metals from said oil under said conditions of operation, introducing below the point of feed of said metals-contaminated oil a wash oil in a manner so as to cause upward movement of said metals-contaminated oil through said bed, removing thus cleaned oil from an upper portion of the zone and passing said oil together with some of said wash oil into contact with a cracking catalyst under hydrocarbon cracking conditions thus obtaining a high yield of desired conversion products over a period of time considerably longer and with less carbon formation than could be obtained otherwise.

2. A method according to claim 1 wherein said wash oil is a light cycle oil.

3. A method for cracking a hydrocarbon oil which comprises the steps in combination as follows: flowing a metals-contaminated oil at a temperature of at least about 500° F. upwardly through a downwardly flowing bed of adsorptive treating solids, injecting a wash oil into a lower portion of said bed of solids, removing substantially metal-free oil together with wash oil from a top portion of said bed of solids, passing the metal-free oil and wash oil removed therewith into admixture with a cracking catalyst in a hydrocarbon cracking zone and therein converting said clean oil to useful hydrocarbon products including a light cycle oil which is used as said wash oil, removing solids from said bed of solids, passing at least a portion of said solids into a stripping zone, therein stripping wash oil and any entrained contaminated oil therefrom and returning said oils to said bed of solids.

4. A method for cracking a hydrocarbon oil which comprises the steps in combination as follows: flowing a metals-contaminated oil at a temperature of at least about 500° F. upwardly through a downwardly flowing bed of adsorptive treating solids, injecting a wash oil into a lower portion of said bed of solids, removing substantially metal-free oil together with wash oil from a top portion of said bed of solids, removing solids wetted with wash oil from the bottom of said bed of solids, circulating said solids wetted with wash oil into the top of said bed, passing the metal-free oil and wash oil removed therewith into admixture with a cracking catalyst in a hydrocarbon cracking zone and therein converting said clean oil to useful hydrocarbon products including a light cycle oil which is used as said wash oil.

5. A method according to claim 4 wherein at least a portion of said solids wetted with wash oil being circulated is removed from the circulation, passed to a stripping zone, therein stripped of strippable adsorbed materials and wash oil which is recovered and then regenerating said solids for reuse.

6. A method for cracking a residual hydrocarbon oil which comprises the steps in combination as follows: flowing an oil contaminated with at least one metal selected from the group consisting of iron, nickel and vanadium at a temperature of at least about 700° F. upwardly through a downwardly flowing bed of adsorptive treating solids, injecting a wash oil into a lower portion of said bed of solids, removing substantially metal-free oil together with wash oil from a top portion of said bed of solids, removing solids wetted with wash oil from the bottom of said bed of solids, circulating said solids wetted with wash oil into the top of said bed, passing the metal-free oil and wash oil removed therewith into admixture with a cracking catalyst in a hydrocarbon cracking zone and therein converting said clean oil to useful hydrocarbon products including a light cycle oil which is used as said wash oil.

References Cited in the file of this patent

UNITED STATES PATENTS

| Number | Name | Date |
|---|---|---|
| 1,945,583 | Wietzel et al. | Feb. 6, 1934 |
| 2,398,489 | Arveson | Apr. 16, 1946 |
| 2,414,973 | Nelson | Jan. 28, 1947 |
| 2,552,435 | Knox et al. | May 8, 1951 |
| 2,651,600 | Taff et al. | Sept. 8, 1953 |
| 2,689,209 | Blair | Sept. 14, 1954 |
| 2,689,825 | McKinley | Sept. 21, 1954 |
| 2,696,304 | Gilmore | Dec. 7, 1954 |
| 2,696,305 | Slover | Dec. 7, 1954 |
| 2,701,786 | Evans et al. | Feb. 8, 1955 |
| 2,758,060 | Porter et al. | Aug. 7, 1956 |
| 2,761,821 | Jahnig | Sept. 4, 1956 |
| 2,764,525 | Porter et al. | Sept. 25, 1956 |
| 2,769,770 | Bicek | Nov. 6, 1956 |
| 2,779,715 | Murray et al. | Jan. 29, 1957 |
| 2,781,297 | Appell | Feb. 12, 1957 |
| 2,782,143 | Bicek | Feb. 19, 1957 |
| 2,793,167 | Webber | May 21, 1957 |